June 12, 1923.
V. L. BUCHMAN
RESILIENT TIRE
Filed July 13, 1920
1,458,267
2 Sheets-Sheet 2
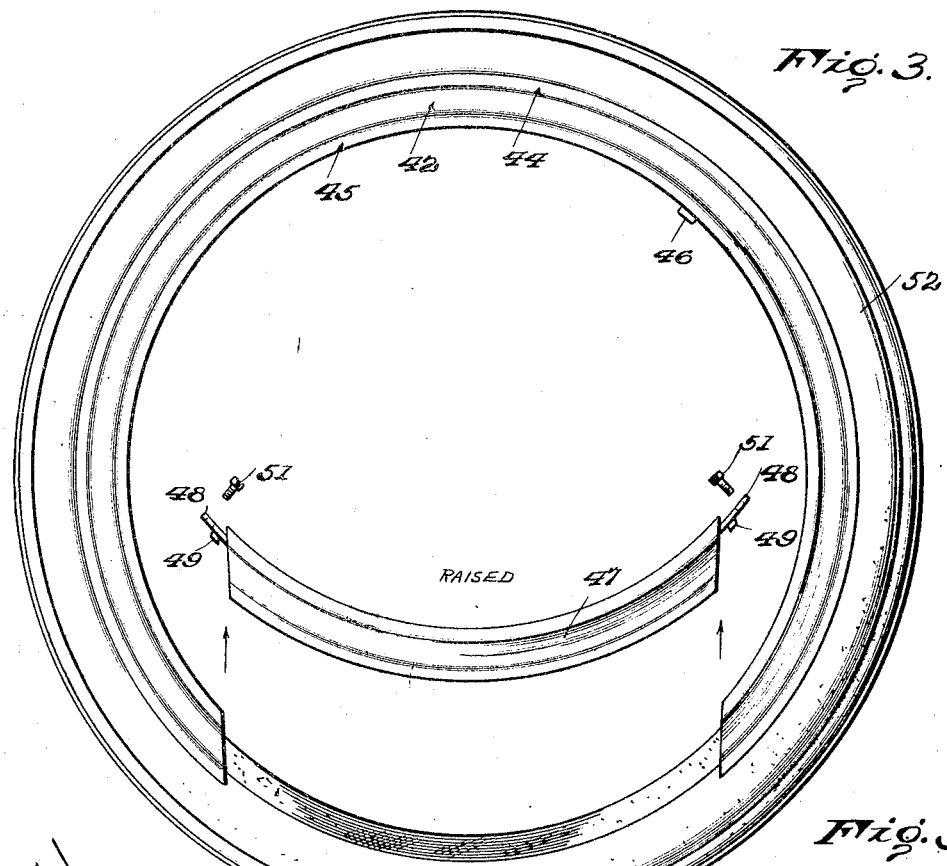
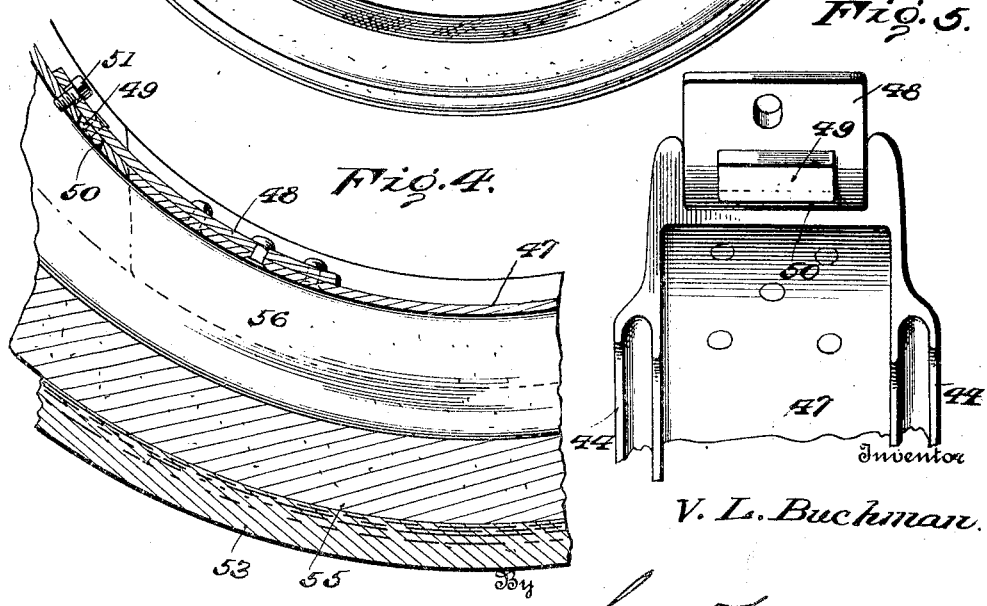
V. L. Buchman.

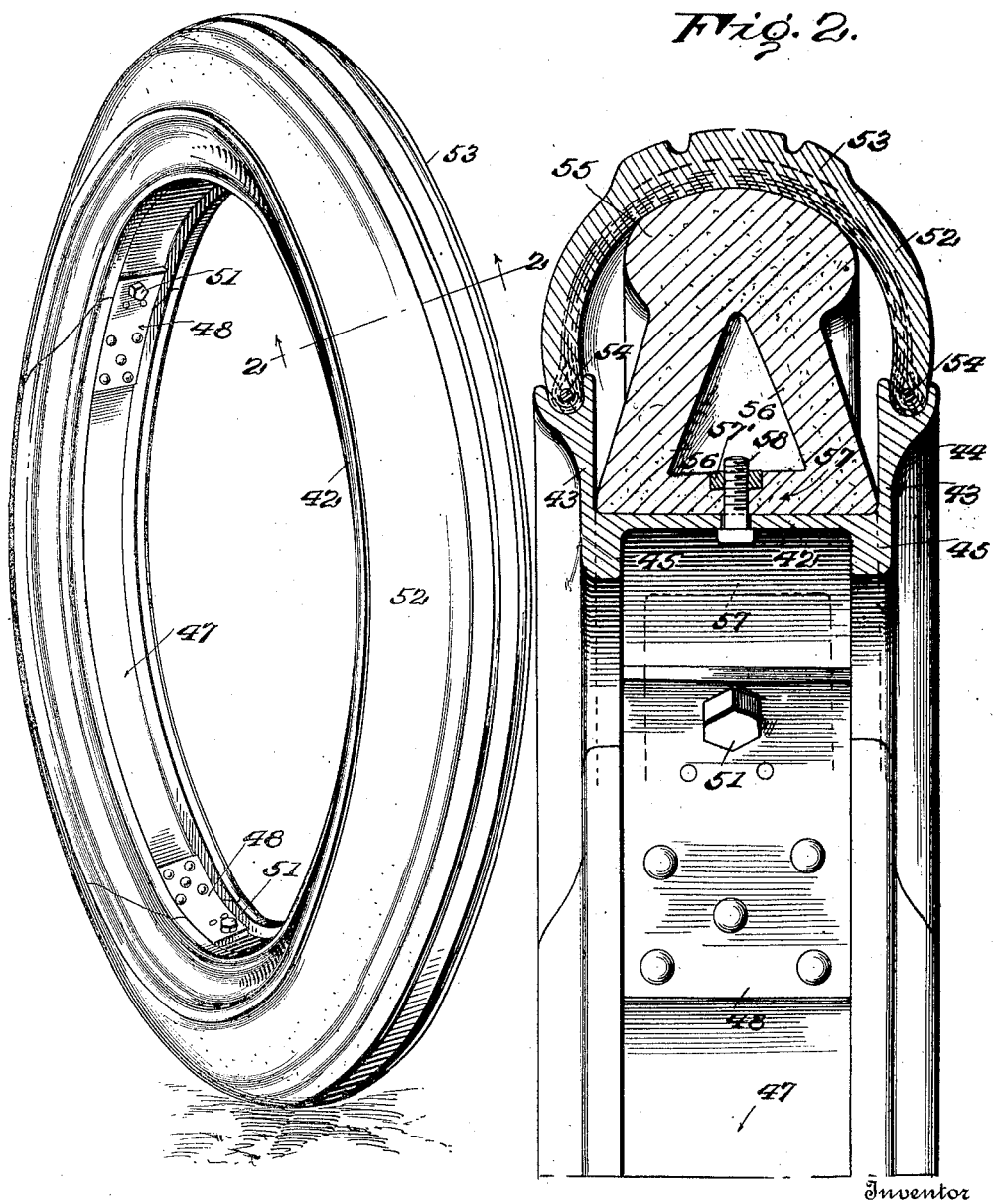

Patented June 12, 1923.

1,458,267

UNITED STATES PATENT OFFICE.

VERNON L. BUCHMAN, OF TRENTON, NEW JERSEY.

RESILIENT TIRE.

Application filed July 13, 1920. Serial No. 395,832.

*To all whom it may concern:*

Be it known that I, VERNON L. BUCHMAN, citizen of the United States, residing at Trenton, in the county of Mercer and State of New Jersey, have invented certain new and useful Improvements in Resilient Tires, of which the following is a specification.

This invention relates to an improved tire and rim and has as one of its principal objects to provide a construction eliminating the use of air as a cushioning means but wherein similar resilient riding qualities will be obtained.

The invention has as a further object to provide a tire and rim wherein the rim will be formed with radial side walls and the side walls of the tire casing will be shortened proportionately for thus effecting a corresponding saving in the material of the casing.

A still further object of the invention is to provide a tire and rim wherein the tire casing may, when worn, be readily removed and a new casing substituted therefor, and wherein the rim will be so formed that the casing may be caused to grip the rim and thus be securely held thereon.

A still further object of the invention is to provide a tire and rim employing a resilient core and wherein the core may be caused to grip the rim base while, at the same time, means will be provided for securing the core against creeping.

And the invention has as a still further object to provide a tire and rim which may be readily used in connection with motor vehicle wheels as now constructed.

Other and incidental objects will appear hereinafter.

In the drawings:

Figure 1 is a perspective view of my improved tire and rim,

Figure 2 is a transverse sectional view taken on the line 2—2 of Figure 1, looking in the direction of the arrows, Figure 3 is a side elevation showing the removable section of the rim detached, Figure 4 is a fragmentary horizontal sectional view showing the connection between the ends of the rim section and the rim body, and Figure 5 is a perspective view particularly showing one of the coupling plates of the rim section.

In carrying the invention into effect, I employ a substantially channel shaped or trough shaped rim 42 which is provided with radial annular side walls 43 lying substantially parallel and formed at their outer edges with annular bead-receiving grooves or channels 44. The inner walls of these channels are provided by a continuation of the side walls of the rim while the outer walls of said channels, which are slightly shorter than the inner walls, are offset laterally outward with respect to the side walls of the rim. Formed on the base of the rim at its side edges are inwardly directed annular ribs 45 which are designed to coact with a felly band for removably supporting the rim upon a wheel and carried by the rim base is a block 46 designed to coact with said band for securing the rim against creeping. As particularly brought out in Figure 3 of the drawings, the rim is formed with a removable section 47 which normally fits between the ends of the rim body completing the annular contour of the rim. As best shown in this figure, the rim body is provided with inwardly divergent end edges which are substantially tangent to the axis of the rim and similarly, the rim section is formed with inwardly divergent end edges adapted to mate with the end edges of the rim body. Consequently, the rim section may be removed inwardly, as suggested in Figure 3, from between the ends of the rim body. Riveted or otherwise secured to the end portions of the base of the rim section are coupling plates 48 which are curved to conform to the curvature of the rim and project beyond the ends of said section. Fixed to these plates at their inner sides are outwardly projecting coupling lugs 49 which, as particularly shown in Figure 4, are provided at their confronting side edges with undercut shoulders 50. The outer side edges of said lugs are beveled to conform to the inclination of said shoulders. Formed in the end portions of the base of the rim body to receive said lugs are suitable openings having beveled side edges to mate with the beveled edges of the coupling lugs. Thus, as will be seen, the rim section may be fitted between the ends of the rim body and first one lug 49 and then the other engaged in the openings in the base of the rim body. Continued outward movement of the rim section to seat between the ends of the rim body will then serve to seat the coupling lugs within said openings rigidly securing the ends of the rim body to abut the ends of the rim section. Freely fitted through the end portions of the coupling plates 48 and threaded through the base of the rim body, are locking bolts 51. By adjusting these bolts the rim section may be readily shifted outwardly between the ends of the rim body and when the bolts are tightened, it will be seen that said bolts will serve to securely lock the rim section against inward displacement from between the ends of the rim body.

Surrounding the rim is a tire casing 52. This tire casing may be built up of suitable layers of fabric and rubber and is provided with a tread 53. Embedded in the marginal portions of the sides of the casing are bead wires or cables 54, and these wires are each continuous so as to rigidly reinforce the beads. The beads of the tire casing are formed to fit snugly in the bead grooves 44 of the side walls of the rim and, as will be observed, due to the presence of the side walls upon the rim, the side portions of the casing are relatively short. A corresponding saving in the material required to construct the casing is thus effected. Seated within the channel of the rim within the tire casing is a resilient core. This core is preferably formed of rubber and different portions of the core may have various consistencies for thus varying the resiliency of such portions of the core according to the cushioning effect desired. As particularly shown in Figure 2, the core is formed with an annular body or thrust portion 55 having its outer face shaped to seat flat against the inner face of the tire casing opposite the tread thereof and extending from the body of the core are inwardly divergent annular side wall portions 56. These side wall portions abut the side walls of the rim at their junction with the rim base while the inner edges of said side wall portions seat flat against the base of the rim. Connecting the side wall portions of the core at a suitable point in its circumference is an integral cross web 57 and embedded in said web is a nut or other approved device 57'. Freely fitted through the base of the rim to engage said nut is a locking bolt or pin 58 securing the core against creeping.

As will now be readily understood in view of the preceding description, the core will resiliently support the tire casing for sustaining the weight of a load and as one casing becomes worn, it may be removed and a new casing substituted therefor. This may be accomplished by removing the locking bolts 51 when, by simply jolting the tire and rim at the side thereof opposite the rim section, the rim section will be forced inwardly from between the ends of the rim body, releasing the tire casing. In this connection, attention is directed to the fact that the normal circumference of the tire beads is slightly less than the circumference of the bead grooves of the side walls of the rim. Further, the normal circumference of the inner edges of the side wall portions of the core is slightly less than the circumference of the base of the rim. However, when the rim section 47 is removed, the end portions of the rim body will flex inwardly sufficiently to free the tire casing. On the other hand, when the rim section is forced outwardly between the ends of the rim body and the end portions of the rim body assume their normal position, the bead grooves will be caused to bind against the beads of the tire casing so that said beads will be stressed or tensioned within said grooves. Similarly, the base of the rim will bind against the inner edges of the side wall portions of the core so that the core will be stressed or tensioned about the base of the rim. As will be seen, the casing will thus be securely held in engagement with the rim while the core will be held to tightly fit the rim base.

Having thus described the invention, what is claimed as new is:

1. In a wheel construction of the class described, a rim body having side walls and provided with beveled end edges converging toward the outer side of the body, a detachable rim section slidably fitting between the ends of the rim body and having beveled end edges mating with the end edges of the rim body, said rim section being movable inwardly and radially of the rim body to released position, coupling plates fixed to the ends of the rim section and overlapping the ends of the rim body, lugs upon said plates extending through the rim body and provided with beveled confronting shoulders coacting with the rim body, and bolts fitting through the plates and engaging the base of the rim body for securing said rim section against displacement.

2. In a wheel construction of the class described, a rim body having outwardly extending side walls and spaced inwardly extending annualr ribs, a detachable rim section slidably fitting between the ends of the rim body and movable inwardly and radially thereof to released position, a coupling plate carried by each end of the rim section, said coupling plates fitting between and bearing against the annular ribs of the rim and overlapping the ends of the rim body and provided with means engaging through the ends of the rim body, and means extending through the plates and coacting with said rim body for securing the rim section against displacement.

3. In a rim construction, a rim having flanges forming interior and exterior annular channels with transversely flat bottoms, said rim including a rim body and a detachable section, said section having substantially parallel end faces mating with corresponding faces on the rim body, and coupling plates extending between the flanges of said interior channel and secured in the bottom thereof both to said rim body and said detachable section.

In testimony whereof I affix my signature.

VERNON L. BUCHMAN. [L. S.]